United States Patent
Dwersteg

(10) Patent No.: US 12,176,841 B2
(45) Date of Patent: Dec. 24, 2024

(54) METHOD AND CIRCUIT ARRANGEMENT FOR CONTROLLING A STEPPER MOTOR

(71) Applicant: Analog Devices International Unlimited Company, Limerick (IE)

(72) Inventor: Bernhard Karl-Heinz Dwersteg, Hamburg (DE)

(73) Assignee: Analog Devices International Unlimited Company, Limerick (IE)

( * ) Notice: Subject to any disclaimer, the term of this patent is extended or adjusted under 35 U.S.C. 154(b) by 176 days.

(21) Appl. No.: 18/106,624

(22) Filed: Feb. 7, 2023

(65) Prior Publication Data

US 2024/0266977 A1 Aug. 8, 2024

(51) Int. Cl.
| | |
|---|---|
| H02P 8/00 | (2006.01) |
| H02P 6/182 | (2016.01) |
| H02P 8/12 | (2006.01) |
| H02P 8/32 | (2006.01) |

(52) U.S. Cl.
CPC ............... *H02P 8/12* (2013.01); *H02P 6/182* (2013.01); *H02P 8/32* (2013.01)

(58) Field of Classification Search
CPC .............. H02P 8/12; H02P 6/182; H02P 8/32
USPC ...................................................... 318/696
See application file for complete search history.

(56) References Cited

U.S. PATENT DOCUMENTS

| | | | |
|---|---|---|---|
| 8,564,230 B2 | 10/2013 | Dwersteg et al. | |
| 9,030,150 B2 | 5/2015 | Dwersteg | |
| 9,112,439 B2 | 8/2015 | Larsson et al. | |
| 10,075,113 B2 | 9/2018 | Dwersteg | |
| 11,437,943 B2 | 9/2022 | Dwersteg | |
| 2020/0358386 A1* | 11/2020 | Lambrechts | ............ H02P 21/09 |
| 2021/0229459 A1* | 7/2021 | Pfeffer | .................. B41J 25/316 |
| 2022/0123673 A1 | 4/2022 | Dwersteg | |

FOREIGN PATENT DOCUMENTS

| | | |
|---|---|---|
| EP | 0666643 A1 | 2/1994 |
| EP | 3826170 A1 | 11/2019 |

OTHER PUBLICATIONS

European Search Report mailed Jun. 7, 2024 in related EP application No. EP 24 15 4392.5 (8 pgs).

\* cited by examiner

*Primary Examiner* — Erick D Glass
(74) *Attorney, Agent, or Firm* — North Weber & Baugh; Michael North

(57) ABSTRACT

A new method and circuit arrangement for operating a stepper motor in a voltage-based operating mode with a control loop over the whole operating range of speeds of a stepper motor. The method/circuit arrangement includes calculating a load angle of the stepper motor. The load angle is then used to calculate a voltage-based control signal suitable for operating a known motor driver circuit, such as a chopper, to drive the stepper motor coils. This enables improved control over the stepper motor which can improve control stability.

20 Claims, 6 Drawing Sheets

METHOD AND CIRCUIT ARRANGEMENT FOR CONTROLLING A STEPPER MOTOR

FIELD

This application relates to methods and circuit arrangements for controlling a stepper motor. Specifically, for controlling a stepper motor in a voltage-based operating mode with a control loop.

BACKGROUND

It is generally known that in stepper motors a magnetic rotor is turned stepwise by each a small angle by means of a controlled rotating electromagnetic field which is generated by the motor's stator coils.

Frequently, it is desired to rotate the motor with as far as possible small step angles, in order to achieve an as high as possible resolution and exactness of the positioning and a uniform course of the motor torque. For these reasons, instead of the known full-step and half-step operation, the so called micro-step operation is preferred in which the currents flowing through the motor coils are not only switched on and off, but also increase and decrease in a certain manner. The resolution and the uniformity with which the stepper motor conducts the micro-steps is in this case substantially dependent on the number of different current amplitude values with which the motor coils can be operated and how exactly these can be kept. Usually, it is most appropriate to excite the motor coils with a sinusoidal- and cosine-wave, respectively, because with this a very continuous and jerk-free rotation of a microstep-optimized motor and by this a calm motor operation can be obtained.

For electrically controlling stepper motors, especially in the micro-step operation, known chopper methods are used. One chopper method is a voltage-based (i.e. voltage-controlled or voltage-regulated) operating mode in which the required coil current is generated by means of a voltage which is applied to the motor coils and which is adjusted by changing its amount (or its amplitude) and its direction (or polarity).

Known chopper methods generated by a chopper are supplied to a motor coil driver circuit, such that the actual coil current follows over its entire (e.g. sine-shaped) course, namely during the increasing and decreasing sections of the coil current, as far as possible promptly and exactly the corresponding specified current (target coil current) for the related motor coil and is at least substantially not influenced by the voltage which is counter-induced by the rotor within the motor coils (counter EMF) or other effects. In other words, each period of the actual coil current is composed of a plurality of chopper phases, by means of which each target coil current value of the current period at each instant of time of the activation of the related chopper phase is generated by means of a voltage applied to the motor coils.

For example, the chopper may output a voltage e.g., a PWM voltage, generated using the motor supply voltage in order to provide the actual coil current to each coil. In particular, the motor supply voltage can be pulse-width-modulated and applied with corresponding polarity to the motor coils, the duty factor of this modulation being controlled or regulated in such a way that the resulting effective voltage across the motor coils each has an amount which causes the instantaneous target coil current value to flow.

SUMMARY OF THE DISCLOSURE

According to a first aspect there is provided a method of operating a stepper motor in a voltage-based operating mode with a control loop, the stepper motor comprising at least a first motor coil and a second motor coil, the method comprising:

measuring a first motor coil current ($I_{ADC_x}$) from the first stepper motor coil;

measuring a second motor coil current ($I_{ADC_y}$) from the second stepper motor coil;

determining a coil current vector based on: the first motor coil current ($I_{ADC_x}$); and the second motor coil current ($I_{ADC_y}$); wherein there is a predetermined phase angle relationship between the first motor coil current ($I_{ADC_x}$) and the second motor coil current ($I_{ADC_y}$);

determining a coil current phase angle ($\angle I$) between the coil current vector and a pre-defined reference angle;

receiving a first voltage-based control signal ($\vec{U}_1$) for operating the stepper motor;

calculating a load angle of the stepper motor based on:
the coil current phase angle ($\angle I$);
an absolute value of the coil current vector ($|I|$); and
the first voltage-based control signal ($\vec{U}_1$);

calculating a second voltage-based control signal ($\vec{U}_2$) based on the load angle; and operating the stepper motor in forward motoring mode using the second voltage-based control signal ($\vec{U}_2$).

The method of the first aspect may provide improved accuracy of load angle calculation which enables improved control over the stepper motor.

Optionally the method further comprises generating a target current based on the load angle of the stepper motor.

Optionally the second voltage-based control signal ($\vec{U}_2$) is further calculated based on the absolute value of the coil current vector ($|I|$). Advantageously, this enables improved control over the stepper motor and can improve stability.

Optionally the method further comprises determining a target load angle proportional to the absolute value of the coil current vector ($|I|$), wherein generating the target current is further based on the target load angle. Advantageously, this surprisingly improves efficiency, and this avoids over-dimensioning of stepper motor.

Optionally, the target load angle is between a lower load angle threshold and an upper load angle threshold, wherein the upper load angle threshold is less than 90 degrees. Advantageously, this improved stability.

Optionally the method further comprises operating the stepper motor in a reverse motoring mode such that the stepper motor is configured to feedback energy into a driver supply. Optionally the method further comprises determining the target load angle proportional to the absolute value of the coil current vector ($|I|$), wherein the target load angle is between a reverse-motoring upper load angle threshold and a reverse-motoring lower load angle threshold.

Optionally, the reverse-motoring upper load angle threshold is set to reduce energy fed back into the driver supply or to maximise energy fed back into the driver supply. Advantageously, this reduces/simplifies requirements for overvoltage protection.

Optionally, the target current is calculated by a target current PI-regulator receiving at its input the difference between the load angle of the stepper motor and the target load angle.

Optionally the method further comprises determining an emf vector based on an estimated first motor coil back-emf voltage ($U_{bemf_x}$) and an estimated second motor coil back-emf voltage ($U_{bemf_y}$). Optionally the method further comprises determining a back-emf voltage phase angle between the emf vector and the pre-defined reference angle. Optionally the method further comprises calculating a load reserve from the difference between the back-emf voltage phase angle and the coil current phase angle ($\angle I$), wherein the load reserve is the load angle minus 90°.

Optionally, the back-emf voltage angle is further determined based on at least one of the following: the supply voltage; inductance of the stepper motor coils; resistance of the stepper motor coils; the first voltage-based control signal ($\vec{U}_1$); and the first and second motor coil currents ($I_{ADC_x}$, $I_{ADC_y}$). Advantageously, this surprisingly provides an improved Uemf.

Optionally, at a first time the stepper motor is operated using the first voltage-based control signal ($\vec{U}_1$), the first time proceeding a second time at which the stepper motor is operated with the second voltage-based control signal ($\vec{U}_2$).

Optionally, the first voltage-based control signal ($\vec{U}_1$) is further calculated based on a first micro-step value associated with a first phase angle position of a micro-step sequencer waveform for operating the stepper motor in a micro-step mode of operation.

Optionally, the second voltage-based control signal ($\vec{U}_2$) is further calculated based on a second micro-step value associated with a second phase angle position of the micro-step sequencer waveform for operating the stepper motor in a micro-step mode of operation.

Optionally the method further comprises adjusting the second phase angle position of the micro-step sequencer waveform relative to the first phase angle position of the micro-step sequencer waveform based on the coil current phase angle ($\angle I$). Advantageously, the angle control reduces motor resonance. In addition, the reduction of motor current resulting from load angle-based control reduces magnetic flow and thus shifts resonances to lower frequencies, which are better dampened. Or, with other words, there is less waste torque which can excite motor resonance.

Optionally, the adjustment of the second phase angle position of the micro-step sequencer waveform relative to the first phase angle position of the micro-step sequencer waveform is determined with a damping PI-regulator, wherein the PI-regulator receives the coil current phase angle ($\angle I$).

Optionally, the second voltage-based control signal ($\vec{U}_2$) is further calculated based on a voltage control signal ($|U|$). Optionally the method further comprises calculating the voltage control signal ($|U|$) by regulating the absolute value of the coil current vector based on the target current.

According to a second aspect there is provided a circuit arrangement for operating a stepper motor in a voltage-based operating mode with a control loop, the stepper motor comprising at least a first motor coil and a second motor coil, the circuit comprising:

a control unit for a voltage-based operating mode, configured to generate:

a first voltage-based control signal ($\vec{U}_1$) for operating the stepper motor at a first time;

a second voltage-based control signal ($\vec{U}_2$) for operating the stepper motor at a second time, wherein the first time proceeds the second time at which the stepper motor is operated;

an analog-to-digital converter (ADC) configured to:
measure a first motor coil current ($I_{ADC_x}$) from the first stepper motor coil;

measure a second motor coil current ($I_{ADC_y}$) from the second stepper motor coil, wherein a coil current vector is based on: the first motor coil current ($I_{ADC_x}$); and the second motor coil current ($I_{ADC_y}$), wherein there is a predetermined phase angle relationship between the first motor coil current ($I_{ADC_x}$) and the second motor coil current ($I_{ADC_y}$), wherein a coil current phase angle ($\angle I$) is an angle between the coil current vector and a pre-defined reference angle;

a load angle calculation unit configured to calculate the load angle of the stepper motor based on:
the coil current phase angle ($\angle I$);
an absolute value of the coil current vector ($|I|$); and
the first voltage-based control signal ($\vec{U}_1$);

wherein the second voltage-based control signal ($\vec{U}_2$) is based on the load angle of the stepper motor.

Optionally the circuit arrangement further comprises a target current regulator unit coupled to the load angle calculation unit configured to generate a target current based on the load angle of the stepper motor.

Optionally the circuit arrangement further comprises a load angle controller coupled to the target current regulator unit and configured to: receive the absolute value of the coil current vector ($|I|$); and/or, determine a target load angle proportional to the absolute value of the coil current vector ($|I|$), wherein generating a target current is further based on the target load angle.

The circuit arrangement may optionally further comprise: a micro-step sequencer configured to: generate a micro-step sequencer waveform for operating the stepper motor in a micro-step mode of operation, wherein the micro-step sequencer waveform is discrete and comprises at least: a first micro-step value associated with a first phase angle position of a micro-step sequencer waveform; and optionally a second micro-step value associated with a second phase angle position of the micro-step sequencer waveform. The micro-step sequencer can optionally regulate the second phase angle position relative to the first phase angle position based on the coil current phase ($\angle I$); and, optionally apply the second micro-step value to the control unit to generate the second voltage-based control signal ($\vec{U}_2$).

According to a third aspect there is provided a method for damping stepper motor resonances of a stepper motor, the stepper motor comprising at least a first motor coil and a second motor coil, the method comprising:

measuring a first motor coil current ($I_{ADC_x}$) from the first stepper motor coil;

measuring a second motor coil current ($I_{ADC_y}$) from the second stepper motor coil;

determining a coil current vector based on: the first motor coil current ($I_{ADC_x}$); and the second motor coil current ($I_{ADC_y}$), wherein there is a predetermined phase angle relationship between the first motor coil current ($I_{ADC_x}$) and the second motor coil current ($I_{ADC_y}$);

determining a coil current phase angle ($\angle I$) between the coil current vector and a pre-defined reference angle;

generating a micro-step sequencer waveform for operating the stepper motor in a micro-step mode of operation, wherein the micro-step sequencer waveform is discrete and comprises at least: a first micro-step value associated with a first phase angle position ($t_1$) of a micro-step sequencer waveform; and a second micro-step value associated with a second phase angle position ($t_2$) of the micro-step sequencer waveform;

adjusting the second phase angle position relative to the first phase angle position based on the coil current phase ($\angle I$); and, generating the second voltage-based control signal ($\vec{U}_2$) based on the second phase angle position ($t_2$).

FIGURES

FIG. 2b illustrates a graph of the relationship between the two motor coil currents of FIG. 2a.

DEFINITIONS

Figure 1:
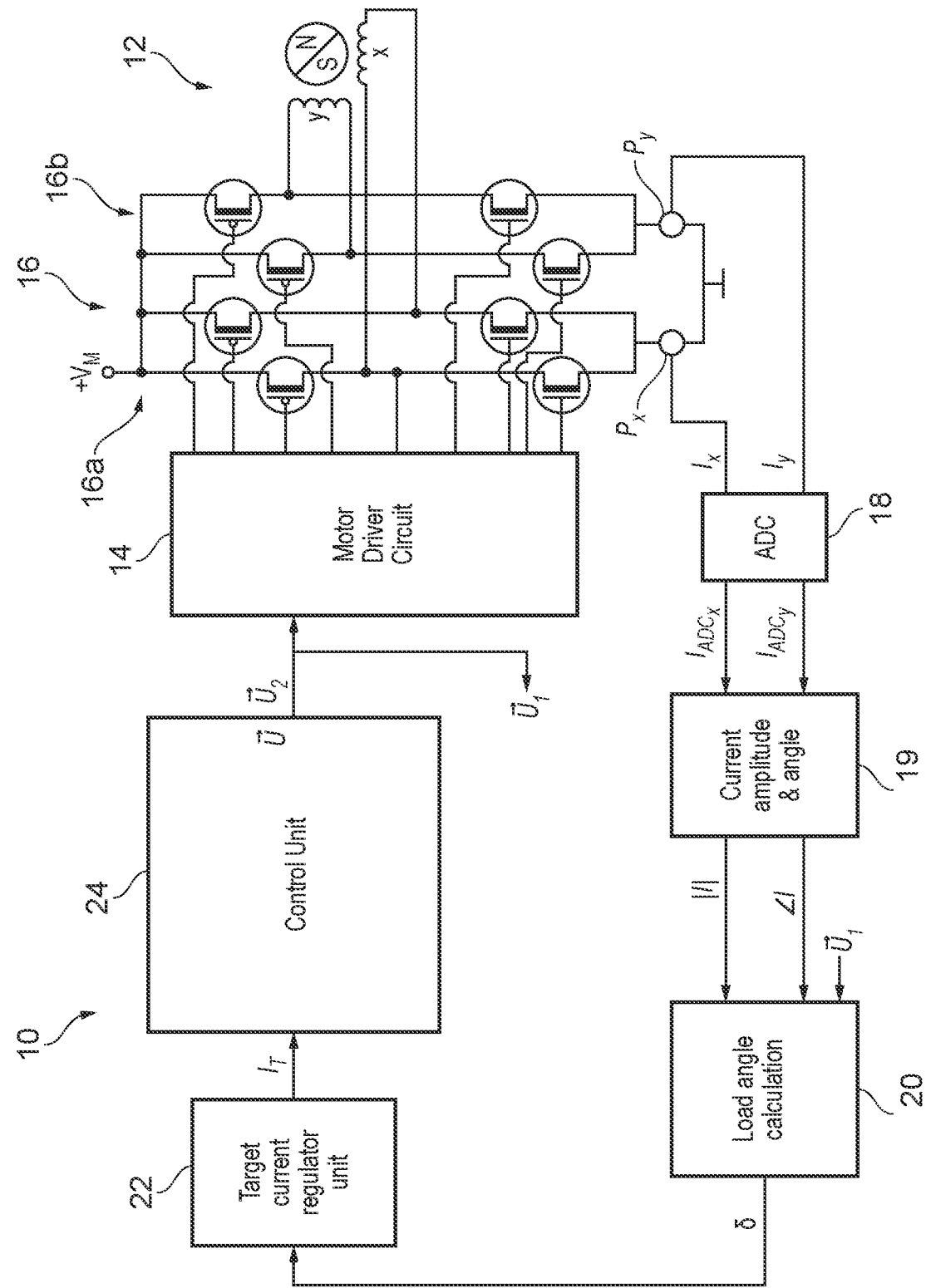
FIG. 1 illustrates a schematic block wiring diagram of a circuit arrangement for operating a stepper motor.

An operating mode with a control loop (i.e., an industrial control loop, or closed loop control) generally includes a process variable sensor for sensing a process variable of a process, a controller for receiving an input signal representative of the process variable and for generating an output signal based on the input signal and a setpoint signal representing a desired value of the process variable, and an actuation device for receiving the output signal and for adjusting the process in response to the output signal. The controller uses the control algorithm to compare the setpoint signal to the input signal from the previous iteration of the loop (e.g., at time t=−1) and to generate the output signal for the current iteration of the loop (e.g., at time t=0). The actuation device adjusts the process in order to bring the process variable towards the desired value represented by the setpoint signal, which will be used as the input for the next iteration of the loop (e.g., at time t=1). The controller may be implemented as a computer program executing on a processor, and the process variable sensor, actuation device, and setpoint input may be connected to the controller via electrical or communication links.

A voltage-based operating mode with a control loop is a control loop operating mode which uses voltage signals to generate a control signal for operating a device.

Regulating involves correcting for an error between the commanded setpoint and the actual value based on some type of feedback. That is, the output of a regulator is determined which, upon a new iteration of a control loop adjusts the actual value to the commanded setpoint.

Operating the stepper motor involves providing a voltage/current to the motor coils of the stepper motor to induce movement in the rotor/stator of the stepper motor.

Over dimensioning is a standard practice in industry in which an oversized (on the NEMA scale) stepper motor is selected for an industrial/consumer application to ensure compliance.

A mechanical load is the load which is coupled to the stepper motor's rotating element (typically the rotor).

DETAILED DESCRIPTION

A problem with a known voltage-regulated operating mode, is that a higher rotational speed and/or a higher load angle of the motor results in a phase shift between the coil voltage and the coil current. This results in a variation between the coil voltage and the coil current so that an exact regulation of the actual measured coil current by changing the coil voltage is no longer readily possible.

A further problem with a known voltage-regulated operating mode is that if a control system implements a shift in a stepper motor's load angle, then this may result in motor oscillations, because a change in load angle also directly leads to a change in motor current unless the driver instantaneously reacts and corrects for it. These motor oscillations may eventually stall the motor. This oscillation may also be excited by the motor's cogging torque and will have a maximum oscillation amplitude at the motor's resonance frequency and multiples of it.

Embodiments of the invention solve the above problems with stepper motor control methods.

As a brief non-limiting overview of the invention, the present disclosure provides a method of operating a stepper motor in a voltage-based operating mode with a control loop over the whole operating range of speeds of a stepper motor. The method includes calculating a load angle of the stepper motor. The load angle is then used to calculate a voltage-based control signal suitable for operating a known motor driver circuit, such as a chopper, to drive the stepper motor coils. This enables improved control over the stepper motor which can improve control stability.

FIG. 1 shows an example of a schematic block wiring diagram of a circuit arrangement 10 for carrying out the method in accordance with the invention. FIG. 1 also shows how each block relates to method steps. The circuit arrangement 10 shows a stepper motor 12 controlled in a voltage-based operation with a control loop (such as, a current control loop). The stepper motor 12 is controlled with a motor driver circuit 14, for example a voltage chopper. The motor driver circuit 14 generates a drive voltage for each coil of the stepper motor 12, for example the drive voltage may be a pulse width modulation (PWM) voltage for operating the stepper motor 12.

In a simple case of a 2-phase stepper motor 12 it may be assumed that one of the two coils (e.g., coil x) is subjected to a sinusoidal current course and the other coil (e.g., coil y) is supplied with a current course which is phase-shifted by 90° and thus co-sinusoidal. The stepper motor 12 may also be controlled in micro-step operation with a PWM voltage which results in a substantially sinusoidal motor coil current within the coils x, y. However, the following considerations also apply accordingly in the alternative case of: non-sinusoidal motor coil current; stepper motors with the same or a different number of phases; an associated phase shift of the motor coil currents relative to one another which is not 90°; and/or a stepper motor operated in a full- and a half-step operation.

A PWM voltage is generated from a motor supply voltage, such that the amplitude of the motor supply voltage defines the amplitude of the PWM voltage. In particular, the motor supply voltage can be pulse-width-modulated and applied with corresponding polarity to the motor coils x, y. The duty factor of this modulation being controlled or regulated in such a way that the resulting effective voltage across the motor coils each has an amount which causes an instantaneous motor coil current value to flow. Alternatively, other methods may be used to cause the instantaneous target motor coil currents value to flow. The control of the PWM may be based on a voltage-based control signal $\vec{U}$ using known methods.

It is preferred to measure the actual motor coil current to regulate a duty factor of the PWM voltage applied to the respective motor coil via a closed loop voltage-based operating mode (that is, a voltage-based operating mode with a control loop). The actual motor coil current can be detected, for example, by means of an analog-to-digital converter (ADC) in order to control the amplitude or the amount of the voltage applied to the coil, or the duty factor of the PWM voltage, e.g. via a regulator, preferably a PI-regulator.

The circuit arrangement 10 comprises, as components known per se, an integrated motor driver circuit 14, with which via outputs, first and second bridge circuits 16 are controlled.

The bridge circuits 16 are arranged between a supply voltage +VM and ground, in order to apply in the voltage-based (or voltage-regulated) operating mode a first PWM voltage signal to the coil x and a second PWM voltage signal to the coil. The motor driver circuit 14 receives a voltage-based control signal U in order to control the amplitude or the amount of the voltage applied to each coil, or the duty factor of the PWM voltages, e.g. via control unit 24 comprising a regulator, preferably a PI-regulator. Since these motor driver circuit 14 units are known per se, they do not need to be described in more detail. The invention herein is directed towards the generation of the voltage-based control signal $\vec{U}$.

The voltage-based control signal $\vec{U}$ evolves over time and with each iteration of the control loop, for example at a first time (e.g., t=1) the stepper motor is operated using the first voltage-based control signal $\vec{U}_1$, and at a second time (e.g., t=2) after the first time, the stepper motor is operated with the second voltage-based control signal $\vec{U}_2$. That is, the first voltage-based control signal $\vec{U}_1$ is input into the control loop to generate the second voltage-based control signal $\vec{U}_2$. The output (e.g., the voltage-based control signal) of the control loop is iterated upon as is known in the field of closed loop control/control loops.

The motor coil currents $I_x$, $I_y$ flowing through the coils x, y are measured by probes $P_x$, $P_y$ at the base point (e.g., source of a bridge MOSFET) of the bridge circuit 16. The coil x of the stepper motor 12 (in this example a 2-phase motor) is connected to a first bridge circuit 16a with the first probe $P_x$. The first probe $P_x$ is coupled to an ADC 18 to provide a measurement of the first motor coil current $I_{ADC_x}$. The coil y of the stepper motor 12 (in this example a 2-phase motor) is connected to a second bridge circuit 16b with the second probe $P_y$. The second probe $P_y$ is coupled to the ADC 18 to provide a measurement of the second motor coil current $I_{ADC_y}$. Alternatively, the probes $P_x$, $P_y$ may be in series with a respective coil x, y (i.e., at the connection of the first and second bridge circuits 16a, 16b to the coils x, y).

The probes $P_x$, $P_y$ may be any type of probing means. Although, FIG. 1 is shown with two probes $P_x$, $P_y$, there may be one or two probes per motor coil. For example, the probes $P_x$, $P_y$ may be implemented as a first sense resistor $R_{sx}$ and a second sense resistor $R_{sy}$, respectively. The first sense resistor $R_{sx}$ and second sense resistor $R_{sy}$ may be positioned at the base point of the bridge circuits 16, such that the voltage drop across a first sense resistor $R_{sx}$ and a second sense resistor $R_{sx}$ at the base point of the bridge circuits 16 is measured.

The ADC 18 may provide current values (e.g., first motor coil current $I_{ADC_x}$, second motor coil current $I_{ADC_y}$) which are positive or negative values.

The first motor coil current $I_{ADC_x}$ and second motor coil current $I_{ADC_y}$ are analysed to determine the components of a coil current vector. The coil current vector is defined by the first motor coil current $I_{ADC_x}$ and the second motor coil current $I_{ADC_y}$. In addition, there is a known predetermined phase angle relationship between the first motor coil current $I_{ADC_x}$ and the second motor coil current $I_{ADC_y}$. For example, a processor may be configured to determine the coil current phase angle $\angle I$ and the absolute value of the coil current vector.

Figure 2A:
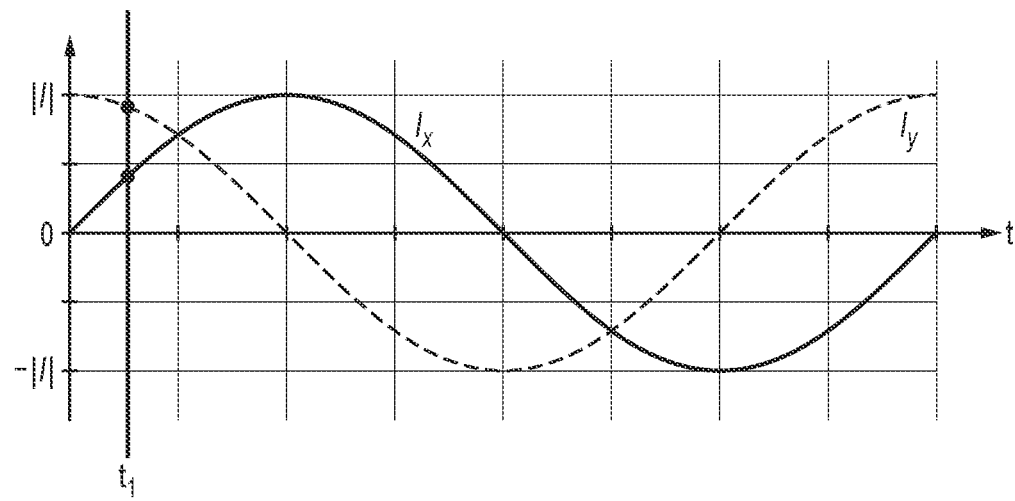
FIG. 2a illustrates a graph of two motor coil currents, one from each motor coil, over a time period.
Figure 2B:
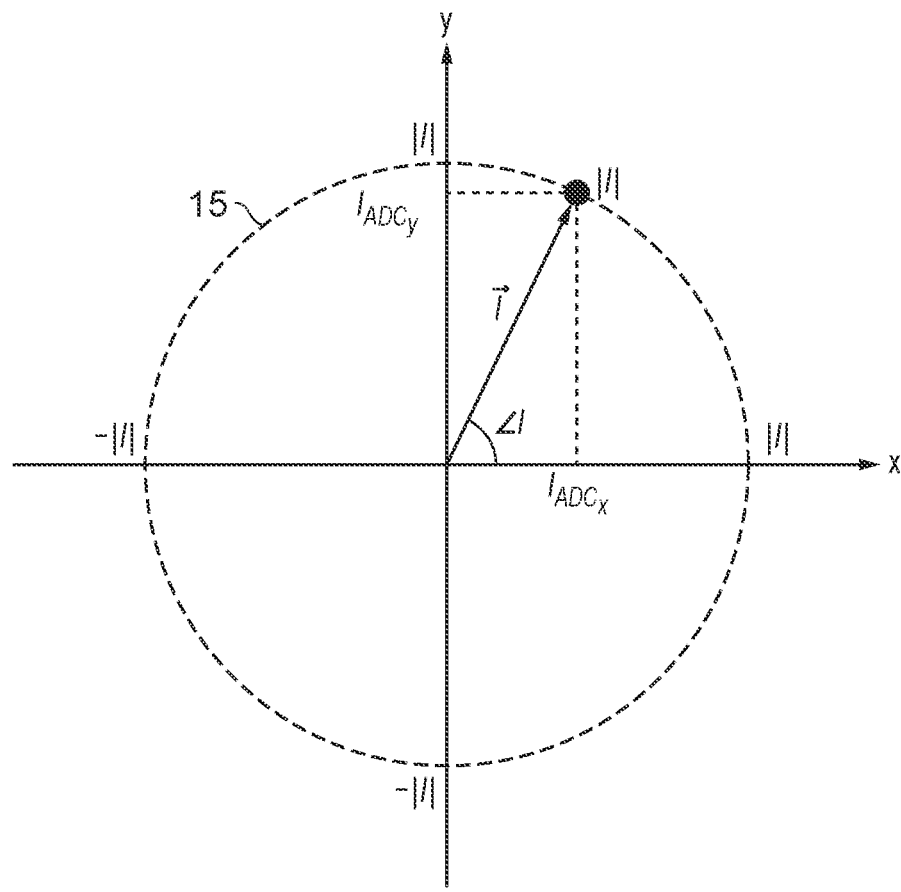

FIG. 2a shows a simplified example of the actual motor coil currents $I_x$, $I_y$ on each coil over a time period. At time $t_1$ the ADC 18 may sample the actual motor currents $I_x$, $I_y$ to generate the first and second motor coil currents $I_{ADC_x}$, $I_{ADC_y}$ respectively. FIG. 2b shows a graphical representation of the first and second motor coil currents $I_{ADC_x}$, $I_{ADC_y}$ on a graph with an x-axis representing the phase of the coil x, and a y-axis representing the phase of the coil y. The phase angle relationship between the first motor coil current $I_{ADC_x}$ and the second motor coil current $I_{ADC_y}$ is represented by the shape of a dashed circle 15. The phase angle relationship may be predetermined by the shape of the waveforms in FIG. 2a and/or the phase angle between actual motor coil currents $I_x$, $I_y$. This may be predetermined via knowledge of the stepper motor 12 though known means per se.

Therefore, the absolute value of the coil current vector $|I|$ can be determined by measuring the first and second motor coil currents $I_{ADC_x}$, $I_{ADC_y}$. Specifically, $|I|=\sqrt{I_{ADC_x}^2+I_{ADC_y}^2}$. The coil current phase angle $\angle I$ can be determined between the coil current vector $\vec{I}$ and a pre-defined reference angle. For example, the pre-defined reference angle may be 0°, or any other pre-determined angle. Thus, the coil current vector $\vec{I}$ is defined by the absolute value $|I|$ and the coil current phase angle $\angle I$. Alternatively, the coil current phase angle $\angle I$ may be calculated based on the first and second motor coil currents $I_{ADC_x}$, $I_{ADC_y}$ measurements using an A TAN 2 function.

Returning to FIG. 1, the motor driver circuit 14 receives a voltage-based control signal $\vec{U}_1$ at a first time t=1 for operating the stepper motor 12. The voltage-based control signal $\vec{U}_1$ results in motor coil currents $I_x$, $I_y$ and corresponds with the absolute value $|I|$ and the coil current phase angle $\angle I$ as measured by the ADC 18 and calculated by a calculation unit 19. A load angle calculation unit 20 receives as an input the absolute value $|I|$, the coil current phase angle $\angle I$, and the first voltage-based control signal $\vec{U}_1$. Any timing delays may be neglected or compensated for with known means per se.

Figure 3:
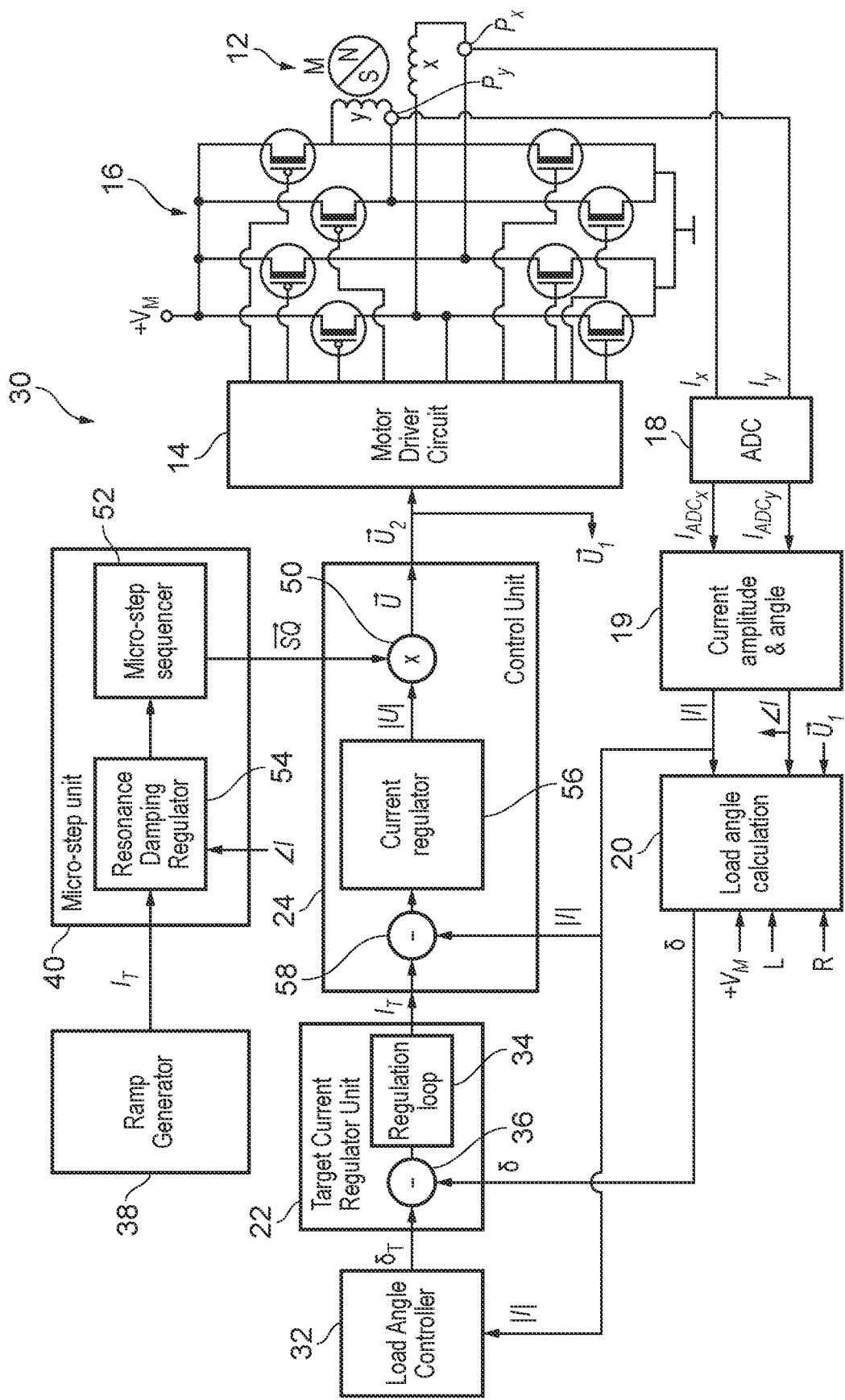
FIG. 3 illustrates an additional schematic block wiring diagram of a circuit arrangement for operating a stepper motor with optional features.

The probes $P_x$, $P_y$ may be in series with a respective coil x, y (i.e., at the connection of the first and second bridge circuits 16a, 16b to the coils x, y). Alternatively, the motor coil currents $I_x$, $I_y$ flowing through the coils x, y may be measured by probes $P_x$, $P_y$ at the base point (e.g., source of a bridge MOSFET) of the bridge circuit 16. Although, FIG. 3 is shown with two probes $P_x$, $P_y$, there may be one or two probes per motor coil (these may be in a combination of series and/or at the base point).

The load angle calculation unit 20 is configured to calculate the load angle of the stepper motor based on: the coil current phase angle $\angle I$, the absolute value of the coil current vector $|I|$; and the first voltage-based control signal $\vec{U}_1$. The second voltage-based control signal $\vec{U}_2$ is calculated based on the load angle.

In a stepper motor the direction of the rotor is defined by its magnetization. If there is no mechanical load, the angle of the rotor corresponds to the main direction of the magnetic field that is generated by the coils—this corresponds to a load angle of 0°. If the direction of the magnetization of the rotor in a two-pole motor is orthogonal to the main direction of the magnetic field that is generated by the coils, then this corresponds to a load angle of 90°. This means that in a two-pole motor the load angle, when the motor is at a standstill, corresponds directly to the mechanical deflection by the neutral position on the motor shaft caused directly prior to the torque (without load and with a load angle of 0°).

In higher pole motors the load angle is an integral multiple of this mechanical deflection by the neutral position. In high pole-count motors the determination of the load angle therefore would require very high resolution rotary pulse generators and very precise current measurements.

The determination of the mechanical motor load according to the invention that is represented by the load angle is based on the voltage that is counter-induced in the motor coils by the rotation of the rotor (Back-electromotive force, Back-EMF, or counter-electromotive force, CEMF) and especially on the amount of this Back-EMF, which is position controlled in order to achieve a specified current flow in the respective stepper motor coil.

Advantageously, the load angle calculation unit 20 enables a load angle of the stepper motor 12 to be detected in a sensor-free manner.

There are many load angle calculation schemes known in the field of sensorless operated PMSM motor algorithms. The load angle calculation may determine a load reserve $\delta$. The load reserve $\delta$ gives a measure for the amount of torque still available and not used by mechanics of a stepper motor at the given motor current. If the load reserve $\delta$ is approximately 0°, then the load angle is approximately 90°. That is, the load reserve $\delta$=the load angle −90°.

Since the torque and the holding torque of a stepper motor for the most part are proportional to the RMS (root mean square) value of the motor current, multiplied by the sine of the load angle, then the stepper motor, in most situations, will be operated with motor current that is much too high in relation to the current actual motor load, i.e. the stepper motor is typically operated at a torque reserve that is much too high. For example, if the motor is operated with a mean torque reserve of 100%, i.e., with a motor current that is twice as high as required, the result, given that the power loss of the motor is proportional to the square of the motor current, is a static power loss that is increased by a factor of four. Since the mechanical power taken in stepper motors often is small compared to the static power loss, energy losses ranging from 100 to 300% are to be expected. This power loss is not desirable. While a reduction of these losses would be possible by using rotary sensors (position sensors, rotary pulse generators) and analysing the rotational positions of the rotor, this concept is generally rejected by industry for (cost-intensive) stepper motor applications in which a stepper motor is used as a purely forward propelled drive and in which angle of rotation sensors thus are not required.

In contrast, and as shown in FIG. 1, the load reserve $\delta$ (or the load angle) is used to generate a voltage-based control signal to operate the stepper motor 12.

The load reserve $\delta$ may be calculated from the difference between: the coil current phase angle $\angle I$, and a back electromotive force (back-EMF) voltage phase angle. The back electromotive force (back-EMF) voltage phase angle is defined by the phase angle between: a vector defined by an estimated first motor coil back-emf voltage $U_{bemf_x}$ and an estimated second motor coil current $U_{bemf_y}$; and the pre-defined reference angle. The estimated first and second motor coil back-emf voltages are estimated from the first voltage-based control signal $\vec{U}_1$.

The load angle calculation unit 20 may have access to data which allows the load angle calculation unit 20 to determine how the motor drive circuit 14 generates a drive voltage in response to the first voltage-based control signal $\vec{U}_1$. A drive voltage for each coil is provided to a respective stepper motor 12 coil x, y. The drive voltage for each coil is based on the first voltage-based control signal $\vec{U}_1$. Therefore, an estimated drive voltage may be based on the first voltage-based control signal $\vec{U}_1$, which may be used to determine both motor coil back-EMF voltages.

The load angle calculation unit 20 may be arranged to determine an emf vector based on an estimated first motor coil back-emf voltage $U_{bemf_x}$ and an estimated second motor coil back-emf voltage $U_{bemf_y}$. The load angle calculation unit 20 may further be arranged to determine a back-emf voltage phase angle between the emf vector and the pre-defined reference angle. The load angle calculation unit 20 may further be arranged to calculate the load reserve.

The back-emf voltage angle may be further calculated based on any of: the supply voltage $+V_M$; the resistance R of the stepper motor coil x; the resistance R of the stepper motor coil y; and the inductance L of the stepper motor coil x; the inductance L of the stepper motor coil y. A stepper motor coil x, y may be typically modeled as a voltage source (in opposition to the coil driving voltage (e.g., PWM voltage signals) and a resistor. Advantageously, the supply voltage may correspond to the amplitude/scaling of PWM voltage signals, which can improve the calculation of the back-emf voltage angle. A stepper motor coil may be modeled as a voltage source (in opposition to the coil driving voltage), a resistor, and an inductor. Surprisingly, the inclusion of the use of a coil inductor L in the calculation of the back-emf voltage angle provides an unexpectedly large benefit to the accuracy of the back-emf voltage angle.

The load angle=the load reserve $\delta$+90°. Therefore, the load angle calculation unit 20 may optionally determine the load angle. Thus, the output of the load angle calculation unit 20 may be the load angle and/or the load reserve $\delta$.

A target current regulator unit 22 is coupled to the load angle calculation unit 20. The target current regulator unit 22 is configured to generate a target current $I_T$ based on the load angle (i.e., 90° plus the load reserve $\delta$) of the stepper motor 12. The target current regulator unit 22 may use a generated or pre-determined target load angle as a commanded setpoint. The pre-determined target load angle may be determined based on a specific industrial application of the stepper motor 12. The target current regulator unit 22 compares the target load angle to the actual load angle (or optionally the target current regulator unit 22 compares the target load reserve to the actual load reserve), to generate the target current $I_T$. The target current regulator unit 22 may comprise a PI regulator (to regulate the target current $I_T$ within the limits of the stepper motor 12) to, upon a next iteration of the control loop, adjust the load angle (or load reserve) to reduce the error between the next load angle (or next load reserve) and the target load angle (or target load reserve). That is, the target current regulator unit 22 may generate a target current $I_T$ for the stepper motor 12 which is adapted to the mechanical motor load.

A control unit 24 is coupled to the output of the target current regulator unit 22. The control unit 24 receives as an input: the target current $I_T$, the absolute value of the coil current vector |I|, and optionally a micro-step sequencer signal. The control unit 24 generates a second voltage-based control signal $U_2$ based on the target current $I_T$ and the absolute value of the coil current vector |I|. The generation of a voltage-based control signal (suitable for being provided to a motor driver circuit 14) from an input current is known per se. The second voltage-based control signal $U_2$ is for operating the stepper motor 12 at a second time t=2, after the first time t=1. That is, the first voltage-based control signal $\vec{U}_1$ is for generating the next iteration of the voltage-based control signal of the control loop (i.e., the second voltage-based control signal $\vec{U}_2$).

The motor driver circuit 14 is arranged to generate a first motor coil driving voltage with the second voltage-based control signal $\vec{U}_2$. The first motor coil driving voltage is configured to be applied to the first stepper motor coil x. The motor driver circuit 14 is arranged to generate a second motor coil driving voltage with the second voltage-based control signal $\vec{U}_2$. The second motor coil driving voltage is configured to be applied to the second stepper motor coil y. Therefore, the second voltage-based control signal $\vec{U}_2$ may operate the stepper motor 12 to result in motor coil currents $I_x$, $I_y$ and corresponds with the absolute value |I| and the coil current phase angle $\angle I$ at a further time. The voltage-based operating mode repeats.

FIG. 3 shows an example of a schematic block wiring diagram of a circuit arrangement 30 for carrying out the method in accordance with the invention. FIG. 3 also shows how each block relates to method steps. The circuit arrangement 30 shows all of the features of schematic block wiring diagram of a circuit arrangement 10 of FIG. 1, in addition to certain optional features. The same reference numerals are used to denote the same/corresponding features in relation to FIG. 1 and will not be described in detail again below.

The schematic block wiring diagram of a circuit arrangement 30 operating in a voltage-based operating mode with a control loop (such as, a current control loop) may further include a load angle controller 32 arranged to receive the absolute value of the coil current vector |I| and generate a target load reserve $\delta_T$ (and/or target load angle). The output of the load angle controller 32 may be coupled to the input of the target current regulator unit 22. The load angle controller 32 may be configured to determine a target load reserve $\delta_T$ (and/or target load angle) proportional to the absolute value of the coil current vector |I|. The target load reserve $\delta_T$ (and/or target load angle) may be input into the target current regulator unit 22 to provide the commanded setpoint.

Typically, stepper motors in closed loop systems are controlled to operate at a 90° load angle, that is, at maximum torque. If the stepper motor coils are provided with a certain electrical power at a 90° load angle, then any variation of load angle results in the same power being applied to the motor coils but with a reduced torque. Therefore, it is typical practice that a skilled person in the art would avoid a load angle which is not 90°.

However, the present inventors realised that at light loads (up to a motor specific defined lower current threshold $I_{Th_{lower}}$), the motor can operate with a lower load angle and lower motor current to satisfy the required torque without significant impact on the overall power budget. The load angle controller 32 may generate a target load angle (<<90°), e.g., a few 10° to 45° in low load situations (down to a lower load angle threshold). At lower load angles the rotor will more closely follow the stator field, and thus results in a stable stepper motor 12 operation, as a certain amount of load change then leads to a reduced change of the load angle. The coil current may be reduced to a fraction of its maximum current (defined by minimum motor current $I_{motor\_min}$). This lowers the current consumption of the stepper motor 12 by supplying the stepper motor 12 coils x, y with just enough current to provide the required torque at the determined (mean) load angle. Surprisingly, a reduced load angle does not have significant impact on the overall power dissipation because the (ohmic) power dissipation of a motor coil is proportional with the square of the motor current, which in turn still is small at low current when compared to a full current power dissipation. Therefore, the load angle controller 32 enables the stepper motor 12 to operate in response to an actual mechanical load applied to the stepper motor or a load angle of the stepper motor 12 such that the current consumption of the stepper motor 12 is as low as possible (i.e., most efficient).

Figure 4A:
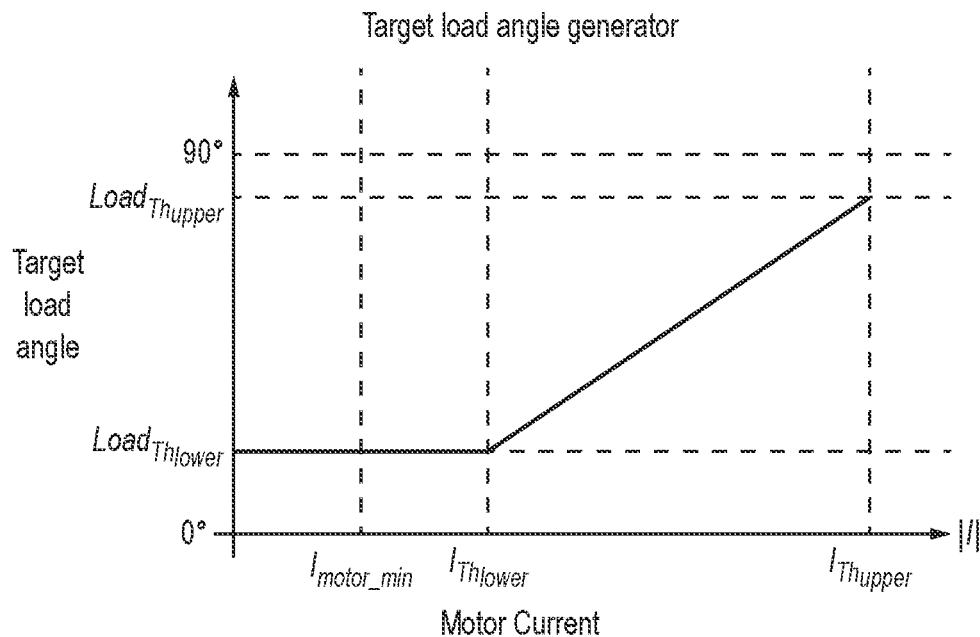
FIG. 4a illustrates a graph of a relationship between a target load angle and an absolute value of the coil current vector in the motoring quadrant of a stepper motor.

FIG. 4a shows a graph of how the target load angle is determined by the load angle controller 32 based on the received absolute value of the coil current vector |I|. It can be seen that each absolute value of the coil current vector |I| maps to a target load angle. Specifically, the target load angle may be proportional to the absolute value of the coil current vector |I|. The load angle controller 32 may generate the target load angle $\delta_T$ between a lower load angle threshold $Load_{Th_{lower}}$ and an upper load angle threshold $Load_{Th_{upper}}$. The required regulation parameters (lower current threshold $I_{Th_{lower}}$ and lower load angle threshold $Load_{Th_{lower}}$; upper current threshold $I_{Th_{upper}}$ and upper load angle threshold $Load_{Th_{upper}}$) can be tuned to the industrial/consumer application.

Advantageously, the use of the load angle controller 32 reduces excess energy fed into the stepper motor 12, and thus reduces excess energy which may induce stepper motor 12 oscillations. Additionally, the reduced field strength reduces any resulting induced oscillation frequency, and thus (if present) a resonance damping regulator 54 may be more effective in dampening oscillations. This avoids over-dimensioning of the stepper motor 12. Over dimensioning is a standard practice in industry in which an oversized (e.g. on the NEMA scale) stepper motor is selected for an industrial/consumer application to ensure compliance.

Another benefit of targeting a reduced load angle in combination with the intended load-adaptive current reduction: targeting a low load angle in low load situations prevents a step loss in response to a sudden mechanical load increase, because the stepper motor's flywheel mass can offer a certain momentum to overcome a portion of the load jerk, until the target current regulation unit 22 can react by sufficiently increasing the motor's target current $I_T$, as determined by its (PI) regulation parameters. During the sudden mechanical load increase, the load angle increases, for example, it may increase towards and above 900. A load angle above 90° leads to reduced torque which may result in a (further) increasing load angle, and thus instability and the danger of step loss. Therefore, it is beneficial to have sufficient load angle reserve to avoid the load angle exceeding the critical threshold of 90°. Therefore, an upper load angle threshold $Load_{Th_{upper}}$ is defined which is below 90° (for example, 85°, 80°, 75°, or 70°). For this reason, the value of the load reserve δ is useful because it represents how much of a 'buffer' there is to maintain stability in response to a sudden mechanical load increase.

The stepper motor 12 may be operated in a reverse motoring mode (i.e., regenerative operation [negative load angle]) such that the stepper motor is configured to feedback energy into a driver power supply. When operating in the reverse motoring mode the load angle controller 32 may determine the target load angle proportional to the absolute value of the coil current vector |I|. The target load angle is between a reverse-motoring upper load angle threshold $Load_{gTh_{upper}}$ and a reverse-motoring lower load angle threshold $Load_{gTh_{lower}}$.

This behaviour shows a stabilizing effect on the system, as the load angle controller 32 behaviour corresponds to the natural behaviour of the stepper motor 12 to react to a higher mechanical load with increased load angle.

Figure 4B:
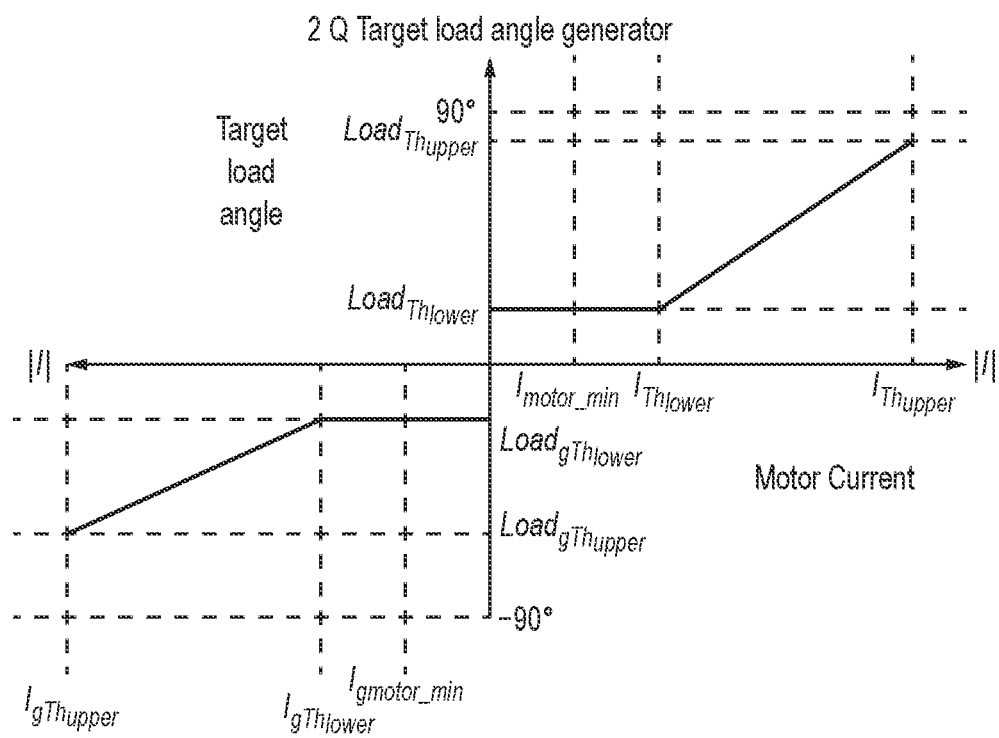
FIG. 4b illustrates a graph of a relationship between a target load angle and an absolute value of the coil current vector in the motoring and reverse-motoring quadrants of a stepper motor.

FIG. 4b shows a graph of how the target load angle is determined by the load angle controller 32 based on the received absolute value of the coil current vector |I| and its mode of operation. Determining the mode of operation of the stepper motor 12 may be achieved with many means known per se, e.g., by determination of the load angle. It can be seen that each absolute value of the coil current vector |I| in both modes of operation maps to a target load angle. Specifically, the target load angle may be proportional to the absolute value of the coil current vector |I|. When the stepper motor 12 is operating in a motoring mode, then the load angle controller 32 may generate the target load angle between a lower load angle threshold $Load_{Th_{lower}}$ and an upper load angle threshold $Load_{Th_{upper}}$. When the stepper motor 12 is operating in a reverse-motoring mode, then the load angle controller 32 may generate the target load angle between a reverse-motoring upper load angle threshold $Load_{gTh_{upper}}$ and a reverse-motoring lower load angle threshold $Load_{gTh_{lower}}$. The required regulation parameters (lower current threshold $I_{Th_{lower}}$ and lower load angle threshold $Load_{Th_{lower}}$; upper current threshold $I_{Th_{upper}}$ and upper load angle threshold $Load_{Th_{upper}}$; reverse-motoring lower current threshold $I_{gTh_{lower}}$ and reverse-motoring lower load angle threshold $Load_{gTh_{lower}}$; a reverse-motoring upper current threshold $I_{gTh_{upper}}$ and a reverse-motoring upper load angle threshold $Load_{gTh_{upper}}$) can be tuned to the industrial/consumer application.

Advantageously, this allows for four quadrant operation. Four quadrant operation is important in highly dynamic drives, because active braking of the motor is required. Choosing a lower (negative) target load angle for regenerative operation has the benefit, that the amount of energy fed back from the drive to the power supply can be reduced.

This is beneficial for applications which cannot cope well with energy fed back from the drive into the power supply. Thus, the reverse-motoring upper load angle threshold $Load_{gTh_{upper}}$ may be set to reduce energy fed back into the driver electrical power supply (herein known as the driver supply). This may allow for reduced electrical protection on the driver power supply because excess electrical energy can be transformed into heat by the (resistive) stepper motor 12 coils x, y.

Advantageously, the reverse-motoring upper load angle threshold $Load_{gTh_{upper}}$ may be set to maximise energy fed back into the driver supply. This may allow for a suitable driver power supply to store the generated electrical power.

Returning to FIG. 3, the target current regulator unit may comprise a regulation loop 34 (such as a PI-regulation loop) and a subtractor 36. The target current regulator unit 22 may be arranged to generate the target current $I_T$ for the stepper motor 12 based on the target load reserve $δ_T$ (or target load angle) and the load reserve δ (or target load reserve). The target current regulator unit 22 may use the target load reserve (or target load angle) as a commanded setpoint.

Advantageously, this enables the stepper motor 12 to accurately adapt to a mechanical motor load.

The target current regulator unit 22 may compare the target load reserve/angle to the actual load reserve/angle using the subtractor 36. The subtractor 36 may determine the difference between the load reserve/angle of the stepper motor 12 and the target load reserve/angle (i.e., the error). The target current $I_T$ may be calculated by the regulation loop 34 (e.g., a PI regulator) receiving at its input the difference between the load reserve/angle of the stepper motor 12 and the target load reserve/angle, to generate the target current $I_T$.

FIG. 3 shows a ramp generator 38 coupled to a micro-step unit 40. The ramp generator 38 is known per se and acts as a pulse generator and/or a position pointer/counter for the micro-step unit 40. A known type of micro-step unit 40 is a micro-step sequencer 52. The micro-step sequencer 52 may comprise an index table with many steps (e.g., micro-steps) each corresponding to a phase angle position. The micro-step sequencer 52 is operated to sequentially step through each step in the index table in order in response to a signal generated by the ramp generator 38. The operation and function of a micro-step sequencer 52 will be briefly described with reference to FIGS. 5a, 5b, and 5c.

Figure 5A:
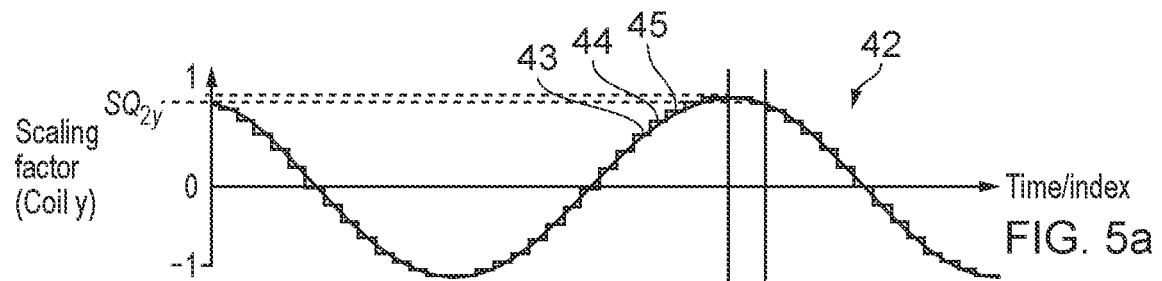
FIG. 5a illustrates a graph of a micro-step sequencer waveform for a first motor coil of the stepper motor.

FIG. 5a shows a first micro-step sequencer waveform 42. The first micro-step sequencer waveform 42 is discrete and comprises many steps. Each step (e.g., 43, 44, 45) represents a micro-step value (e.g., a scaling factor between 1 and −1) at a specific phase angle position (the phase angle position may represent a row in the index table, or a point in time). The first micro-step sequencer waveform 42 may correspond to coil y of the stepper motor 12. The first and second micro-step sequencer waveforms 42, 46 may have a non-zero phase difference.

Figure 5B:
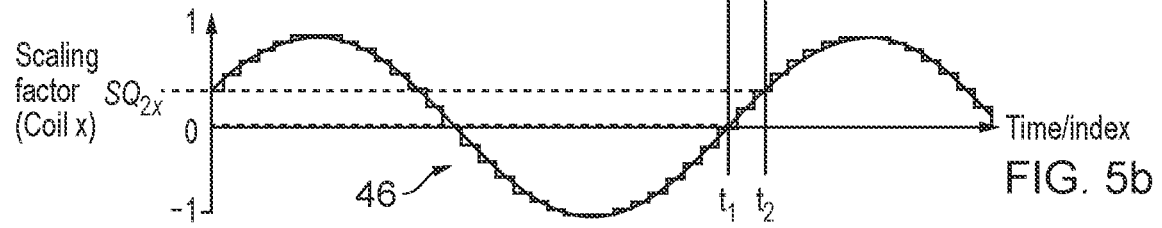
FIG. 5b illustrates a graph of a micro-step sequencer waveform for a second motor coil of the stepper motor.

FIG. 5b shows a second micro-step sequencer waveform 46. The second micro-step sequencer waveform 46 is discrete and comprises many steps. The second micro-step sequencer waveform 46 may correspond to coil x of the stepper motor 12. The second micro-step sequencer waveform 46 may be a phase shifted version of the first micro-step sequencer waveform 42, for example, by 90°.

As an example, a first phase angle positions $t_1$ of the first micro-step sequencer waveform 42 corresponds to the first phase angle position $t_1$ of the second micro-step sequencer waveform 46. The first phase angle position $t_1$ represents a point in the index table (or a point in time t=1). Each phase angle position (e.g., $t_1$, $t_2$) corresponds with a micro-step value (e.g., representing a scale factor). It can be seen that at the first phase angle position $t_1$, a first micro-step value $SQ_{1x}$ for the coil x is 0, and a first micro-step value $SQ_{1y}$ for the coil y is 1. The output of the micro-step unit represents a first micro-step vector $\overrightarrow{SQ_1}$ defined by the first micro-step value $SQ_{1x}$ of the first micro-step sequencer waveform 42 and first micro-step value $SQ_{1y}$ of the second micro-step sequencer waveform 46. The first voltage-based control signal $\vec{U}_1$ may be based on a first micro-step value $SQ_{1x}$ associated with a first phase angle position $t_1$ of the first micro-step sequencer waveform 42 for operating the stepper motor 12 in a micro-step mode of operation.

Similarly, a second phase angle position $t_2$ of the first and second micro-step sequencer waveforms 42, 46 represents a point in the index table (or a point in time t=2). The second voltage-based control signal $\vec{U}_2$ may be based on a second micro-step value $SQ_{2x}$ associated with a second phase angle position $t_2$ of the micro-step sequencer waveform for operating the stepper motor 12 in a micro-step mode of operation.

Figure 5C:
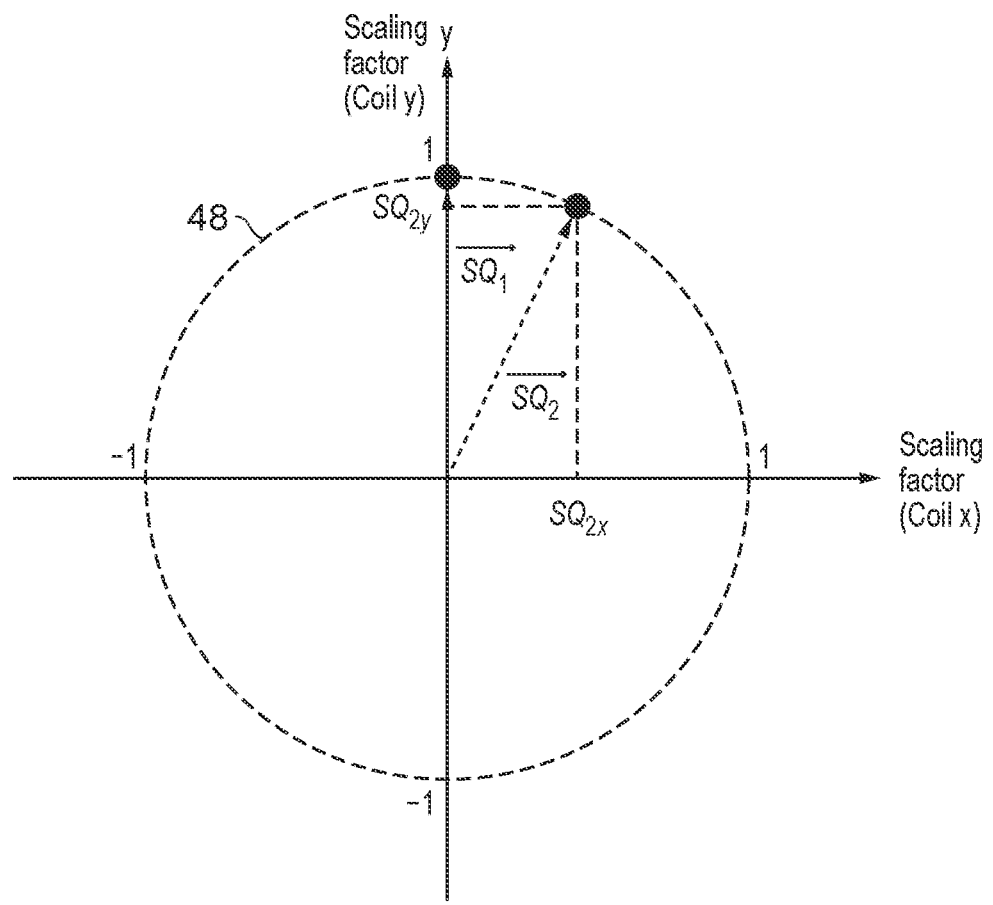
FIG. 5c illustrates a graph of the relationship between the two micro-step sequencer waveforms of FIGS. 5a and 5b.

FIG. 5c shows a graphical representation of the first and second micro-step vectors $\vec{SQ_1}$, $\vec{SQ_2}$ on a graph with an x-axis representing the second micro-step sequencer waveform 46, and a y-axis representing the first micro-step sequencer waveform 42.

Each of the first and second micro-step vectors $\vec{SQ_1}$, $\vec{SQ_2}$ may be determined based on: a micro-step value (e.g., $SQ_{1x}$, $SQ_{2x}$) associated with the second micro-step sequencer waveform 46; and a micro-step value (e.g., $SQ_{1y}$, $SQ_{2y}$) associated with the first micro-step sequencer waveform 42. There is a predetermined (e.g., by the micro-step sequencer) phase angle relationship between the first micro-step sequencer waveform and a second micro-step sequencer waveform. The phase angle relationship between the first micro-step sequencer waveform 42 and the second micro-step sequencer waveform 46 is represented by the shape of a dashed circle 48.

As an example, the absolute value of the first micro-step vector is 1 since the magnitude of the first and second micro-step sequencer waveforms 42, 46 represent a scale factor between −1 and 1. A first micro-step phase angle $\angle SQ_1$ represents the angle between the first micro-step vector $\vec{SQ_1}$ and a pre-defined reference angle (this may correspond to the pre-defined reference angle discussed at FIG. 2b). For example, the pre-defined reference angle may be 0°, or any other pre-determined angle. Thus, the first micro-step vector $\vec{SQ_1}$ is defined by the absolute value 1 (i.e., the maximum of the first waveform 42) and the first micro-step phase angle $\angle SQ_1$. Alternatively, the first micro-step phase angle $\angle SQ_1$ may be calculated based on the first and second micro-step values $SQ_{1x}$, $SQ_{1y}$ using an ATAN 2 function. The second micro-step vector S may be similarly calculated.

FIG. 3 shows that the micro-step unit 40 output (generally referred to as SQ) is applied to a voltage control signal |U| generated by the control unit 24. The voltage control signal |U| is a scalar signal. The voltage control signal |U$_1$| at a time t=1 may be multiplied by the micro-step unit 40 output $SQ_1$ (e.g., with a multiplier 50) to generate the first voltage-based control signal $\vec{U}_1$. Therefore, the first voltage-based control signal $\vec{U}_1$ is a vector. Similarly, the voltage control signal |U$_2$| at a time t=2 may be multiplied by the micro-step unit 40 output Q (e.g., with a multiplier 50) to generate the second voltage-based control signal $\vec{U}_2$. That is, the second voltage-based control signal $\vec{U}_2$ is a coil control vector which may be defined by the voltage control signal |U|, and at least two of: (i) the predetermined (e.g., by the micro-step sequencer) phase angle relationship between the first micro-step sequencer waveform and a second micro-step sequencer waveform (e.g., the shape of the dashed circle 48 in FIG. 5c); (ii) the second micro-step value $SQ_{2x}$ associated with the second micro-step sequencer waveform 46; and (iii) the second micro-step value $SQ_{2y}$ associated with the first micro-step sequencer waveform 42.

The micro-step unit 40 may advantageously comprise a resonance damping regulator 54 (e.g., regulation loop such as a PI-regulator) configured to provide control of a phase angle position of a micro-step sequencer 52. That is, the second phase angle position $t_2$ of the first micro-step sequencer waveform 42 (or second micro-step sequencer waveform 46) relative to the first phase angle position $t_1$ of the first micro-step sequencer waveform 42 (or second micro-step sequencer waveform 46) may be adjusted based on the coil current phase angle $\angle I$. Thus, the outputs SQ corresponding to the phase angle position of the micro-step sequencer may no longer be sequential steps.

The resonance damping regulator 54 may be implemented as a PI-regulator (which may be called a damping PI-regulator). The adjustment of the second phase angle position $t_2$ relative to the first phase angle position $t_1$ may be determined with the PI-regulator. The PI-regulator may receive the coil current phase angle $\angle I$ and the output of the ramp generator 38. The output of the ramp generator 38 may act as the commanded setpoint. That is, the resonance damping regulator 54 may be arranged to reduce the difference/error between the coil current phase angle $\angle I$ and a target angle output from the ramp generator 38 (via influencing the operating the stepper motor 12). The error between the coil current phase angle $\angle I$ and a target angle output from the ramp generator 38 may be generated by a subtractor.

Advantageously, the position of the second phase angle position $t_2$ can be adjusted/shifted which can improve resonance damping. This control may reduce resonances of the stepper motor 12.

If the micro-step unit 40 comprising the resonance damping regulator 54 is combined with the load angle controller 32 then the circuit arrangement 30 can advantageously dampen oscillations of the stepper motor 12. Specifically, the load angle controller 32 can reduce magnetic flow which shifts resonances to lower frequencies, these lower frequencies may be better dampened with the resonance damping regulator 54.

The control unit 24 may comprise a current regulator 56 based on a measurement of both motor phase currents. Specifically, the current regulator 56 may be a PI-regulator which uses a PI-scheme to regulate the absolute value of the coil current vector |I| to fit the target current $I_T$. That is, the current regulator 56 may be arranged to generate a voltage control signal |U| which operates the stepper motor 12 to reduce the difference/error between the absolute value of the coil current vector |I| to the target current $I_T$. The current regulator 56 may receive at its input the difference (i.e., the error) between the target current $I_T$, and the absolute value of the coil current vector |I| (e.g., which may be generated by a subtractor 58).

Additionally, the resonance damping regulator 54 can be applied to other stepper motor control schemes. Using known methods, any phase offset in the current phase would lead to a mechanical jerk of the stepper motor when switching between a voltage-based motor control scheme and a current-based motor control scheme. Advantageously, the resonance damping regulator 54 may reduce or eliminate mechanical jerk of the stepper motor 12 when switching between voltage-based motor control schemes and current-based motor control schemes. Thus, switching between motor control schemes at any velocity is possible. This allows for combinations of motor control schemes (one of which may be a control scheme as highlighted in FIG. 1 or 3).

Figure 6:
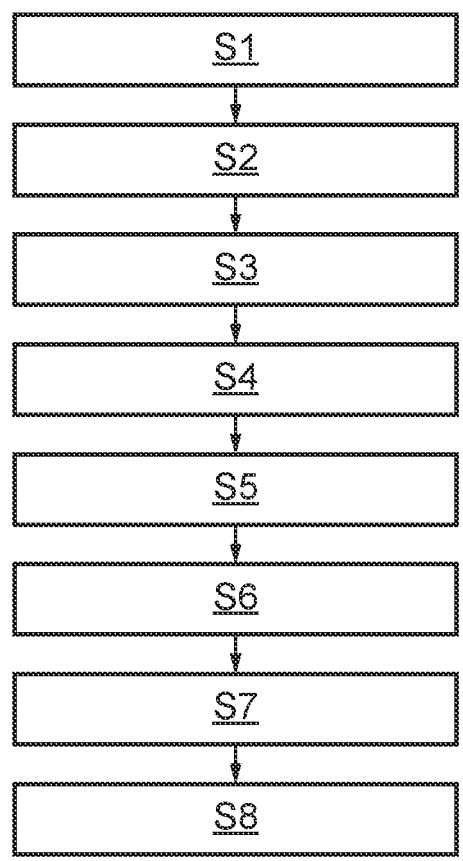
FIG. 6 illustrates a process of damping mechanical oscillations of a stepper motor.

The resonance damping regulator 54 may be applied to other stepper motor control schemes to reduce mechanical resonances in stepper motors comprising at least a first motor coil and a second motor coil. Such a method, as shown in FIG. 6, to reduce mechanical resonances in stepper motors may comprise the following steps:

S1: Measuring a first motor coil current $I_{ADC_x}$ from the first stepper motor coil.

S2: Measuring a second motor coil current $I_{ADC_y}$ from the second stepper motor coil.

S3: Determining a coil current vector defined by: the first motor coil current $I_{ADC_x}$.

S4: The second motor coil current $I_{ADC_y}$; and a predetermined phase angle relationship between the first motor coil current $I_{ADC_x}$ and the second motor coil current $I_{ADC_y}$.

S5: Determining a coil current phase angle $\angle I$ between the coil current vector and a pre-defined reference angle.

S6: Generating a micro-step sequencer waveform 42 for operating the stepper motor 12 in a micro-step mode of operation, wherein the micro-step sequencer waveform 42 is discrete and comprises at least: a first micro-step value $SQ_{1y}$ associated with a first phase angle position $t_1$ of a micro-step sequencer waveform 42; and a second micro-step value $SQ_{2y}$ associated with a second phase angle position $t_2$ of the micro-step sequencer waveform 42.

S7: Regulating the second phase angle position $t_2$ relative to the first phase angle position $t_1$ based on the coil current phase $\angle I$.

S8: Generating the second voltage-based control signal $U_2$ based on the second phase angle position $t_2$.

NUMBERED CLAUSES

By way of non-limiting example, some aspects of the disclosure are set out in the following numbered clauses.

Clause 1—A method of operating a stepper motor in a voltage-based operating mode with a current control loop, the stepper motor comprising at least a first motor coil and a second motor coil, the method comprising:
measuring a first motor coil current ($I_{ADC_x}$) from the first stepper motor coil;
measuring a second motor coil current ($I_{ADC_y}$) from the second stepper motor coil;
determining a coil current vector based on: the first motor coil current ($I_{ADC_x}$); and the second motor coil current ($I_{ADC_y}$); wherein there is a predetermined phase angle relationship between the first motor coil current ($I_{ADC_x}$) and the second motor coil current ($I_{ADC_y}$);
determining a coil current phase angle ($\angle I$) between the coil current vector and a pre-defined reference angle;
receiving a first voltage-based control signal ($\vec{U}_1$) for operating the stepper motor;
calculating a load angle of the stepper motor based on: the coil current phase angle ($\angle I$);
an absolute value of the coil current vector (|I|); and the first voltage-based control signal ($\vec{U}_1$);
calculating a second voltage-based control signal ($\vec{U}_2$) based on the load angle; and
operating the stepper motor using the second voltage-based control signal ($\vec{U}_2$).

Clause 2—The method of clause 1, further comprising:
generating a target current based on the load angle of the stepper motor.

Clause 3—The method of clause 2, wherein the second voltage-based control signal ($\vec{U}_2$) is further calculated based on the absolute value of the coil current vector (|I|).

Clause 4—The method of any of clauses 2 or 3, further comprising:
determining a target load angle proportional to the absolute value of the coil current vector (|I|), wherein generating the target current is further based on the target load angle.

Clause 5—The method of clause 4, wherein the target load angle is between a lower load angle threshold and an upper load angle threshold, wherein the upper load angle threshold is less than 90 degrees.

Clause 6—The method of any of clauses 4 or 5, further comprising:
operating the stepper motor in a reverse motoring mode such that the stepper motor is configured to feedback energy into a driver power supply,
determining the target load angle proportional to the absolute value of the coil current vector (|I|), wherein the target load angle is between a reverse-motoring upper load angle threshold and a reverse-motoring lower load angle threshold.

Clause 7—The method of clause 6, wherein the reverse-motoring upper load angle threshold is set to reduce energy fed back into the driver power supply or to maximise energy fed back into the driver power supply.

Clause 8—The method of any of clauses 4 to 7, wherein the target current is calculated by a target current PI-regulator receiving at its input the difference between the load angle of the stepper motor and the target load angle.

Clause 9—The method of any preceding clause, further comprising:
determining an emf vector based on an estimated first motor coil back-emf voltage ($U_{bemf_x}$) and an estimated second motor coil back-emf voltage ($U_{bemf_y}$)
determining a back-emf voltage phase angle between the emf vector and the pre-defined reference angle; and
calculating a load reserve from the difference between the back-emf voltage phase angle and the coil current phase angle ($\angle I$), wherein the load reserve is the load angle minus 90°.

Clause 10—The method of clause 9, wherein the back-emf voltage angle is further determined based on at least one of the following: the supply voltage; inductance of the stepper motor coils; resistance of the stepper motor coils; the first voltage-based control signal ($\vec{U}_1$); and the first and second motor coil currents ($I_{ADC_x}$, $I_{ADC_y}$).

Clause 11—The method of any preceding clause, wherein at a first time the stepper motor is operated using the first voltage-based control signal ($\vec{U}_1$), the first time proceeding a second time at which the stepper motor is operated with the second voltage-based control signal ($\vec{U}_2$).

Clause 12—The method of any preceding clause, wherein the first voltage-based control signal ($\vec{U}_1$) is further calculated based on a first micro-step value associated with a first phase angle position of a micro-step sequencer waveform for operating the stepper motor in a micro-step mode of operation.

Clause 13—The method of clause 12, wherein the second voltage-based control signal ($\vec{U}_2$) is further calculated based on a second micro-step value associated with a second phase angle position of the micro-step sequencer waveform for operating the stepper motor in a micro-step mode of operation.

Clause 14—The method of clause 13, further comprising:
adjusting the second phase angle position of the micro-step sequencer waveform relative to the first phase angle position of the micro-step sequencer waveform based on the coil current phase angle ($\angle I$).

Clause 15—The method of clause 14, wherein the adjustment of the second phase angle position of the micro-step sequencer waveform relative to the first phase angle position of the micro-step sequencer waveform is determined with a damping PI-regulator, wherein the PI-regulator receives the coil current phase angle ($\angle I$).

Clause 16. The method of any of clause 13 to 15, wherein the second voltage-based control signal ($\vec{U}_2$) is further calculated based on a voltage control signal ($|U|$), wherein the method further comprises:
calculating the voltage control signal ($|U|$) by regulating the absolute value of the coil current vector based on the target current.

Clause 17—The method of any of clause 13 to 16, wherein the micro-step sequencer waveform is a first micro-step sequencer waveform, wherein the second voltage-based control signal ($\vec{U}_2$) is further based on:
the voltage control signal ($|U|$); and
the second micro-step value.

Clause 18—The method of any of clause 17, wherein the second voltage-based control signal ($\vec{U}_2$) is further based on:
a predetermined phase angle relationship between the first micro-step sequencer waveform and a second micro-step sequencer waveform.

Clause 19—The method of any preceding clause, further comprising:
generating a first motor coil driving voltage with the second voltage-based control signal ($\vec{U}_2$), wherein the first motor coil driving voltage is configured to be applied to the first stepper motor coil; and
generating a second motor coil driving voltage with the second voltage-based control signal ($\vec{U}_2$), wherein the second motor coil driving voltage is configured to be applied to the second stepper motor coil.

Clause 20. A circuit arrangement for operating a stepper motor in a voltage-based operating mode with a current control loop, the stepper motor comprising at least a first motor coil and a second motor coil, the circuit comprising:
a control unit for a voltage-based operating mode, configured to generate:
a first voltage-based control signal ($\vec{U}_1$) for operating the stepper motor at a first time;
a second voltage-based control signal ($\vec{U}_2$) for operating the stepper motor at a second time, wherein the first time proceeds the second time at which the stepper motor is operated;
an analog-to-digital converter (ADC) configured to:
measure a first motor coil current ($I_{ADC_x}$) from the first stepper motor coil;
measure a second motor coil current ($I_{ADC_y}$) from the second stepper motor coil, wherein a coil current vector is based on: the first motor coil current ($I_{ADC_x}$); and the second motor coil current ($I_{ADC_y}$),
wherein there is a predetermined phase angle relationship between the first motor coil current ($I_{ADC_x}$) and the second motor coil current ($I_{ADC_y}$), wherein a coil current phase angle ($\angle I$) is an angle between the coil current vector and a pre-defined reference angle;
a load angle calculation unit configured to calculate the load angle of the stepper motor based on:
the coil current phase angle ($\angle I$);
an absolute value of the coil current vector ($|I|$); and
the first voltage-based control signal ($U$);
wherein the second voltage-based control signal ($\vec{U}_2$) is based on the load angle of the stepper motor.

Clause 21—The circuit arrangement of clause 20, further comprising: a target current regulator unit coupled to the load angle calculation unit configured to generate a target current based on the load angle of the stepper motor.

Clause 22—The circuit arrangement of clauses 21, further comprising:
a load angle controller coupled to the target current regulator unit and configured to:
receive the absolute value of the coil current vector ($|I|$); and,
determine a target load angle proportional to the absolute value of the coil current vector ($|I|$), wherein generating a target current is further based on the target load angle.

Clause 23—The circuit arrangement of any of clauses 20 to 22, further comprising: a micro-step unit configured to:
generate a micro-step sequencer waveform for operating the stepper motor in a micro-step mode of operation, wherein the micro-step sequencer waveform is discrete and comprises: a first micro-step value associated with a first phase angle position of a micro-step sequencer waveform.

Clause 24—The circuit arrangement of clause 23, wherein the micro-step sequencer waveform further comprises: a second micro-step value associated with a second phase angle position of the micro-step sequencer waveform.

Clause 25—The circuit arrangement of clause 24, wherein the micro-step unit is further configured to regulate the second phase angle position relative to the first phase angle position based on the coil current phase ($\angle I$).

Clause 26—The circuit arrangement of any of clauses 24 to 25, wherein the micro-step sequencer waveform is a first micro-step sequencer waveform, wherein the second phase angle position is further associated with a second micro-step sequencer waveform, wherein there is a predetermined phase angle relationship between the first micro-step sequencer waveform and a second micro-step sequencer waveform, Clause 27—The circuit arrangement of clause 26, wherein the micro-step unit is further configured to:
generate a micro-step vector based on the second micro-step value ($SQ_{2y}$) associated with the first micro-step sequencer waveform; and a third micro-step value ($SQ_{2y}$) associated with the second micro-step sequencer waveform at the second phase angle position. For example, as disclosed at FIG. 5c.

Clause 28—The circuit arrangement of clause 27, wherein the micro-step unit is further configured to determine a micro-step phase angle ($\angle I$) between the micro-step vector and the pre-defined reference angle, wherein the second voltage-based control signal ($\vec{U}_2$) is further based the second micro-step phase angle.

Clause 29—The circuit arrangement of any of clauses 27 to 28, wherein the second voltage-based control signal ($\vec{U}_2$) is further based the micro-step vector.

Clause 30—The circuit arrangement of any of clauses 20 to 29, wherein the control unit further comprises:
a current regulator coupled to the target current regulator unit, and configured to: receive the target current and the absolute value of the coil current vector and, determine a voltage control signal (|U|) based on the difference between: the target current; and the absolute value of the coil current vector.

Clause 31—The circuit arrangement of clause 30, wherein the current regulator is a PI-regulator.

Clause 32—The circuit arrangement of any of clause 30 to 31, further comprising a motor driver circuit configured to operate the stepper motor based on the voltage control signal (|U|) such that the absolute value of the coil current vector of a subsequent loop/iteration (e.g., at time t=2) is adjusted to the target current.

Clause 33—The circuit arrangement of any of clause 24 to 31, wherein the control unit further comprises:
a multiplier configured to multiply the voltage control signal (|U|) with the second micro-step value to generate the second voltage-based control signal ($\vec{U}_2$).

Clause 34—A method for damping stepper motor resonances of a stepper motor, the stepper motor comprising at least a first motor coil and a second motor coil, the method comprising:
measuring a first motor coil current ($I_{ADC_x}$) from the first stepper motor coil;
measuring a second motor coil current ($I_{ADC_y}$) from the second stepper motor coil;
determining a coil current vector based on: the first motor coil current ($I_{ADC_x}$); and the second motor coil current ($I_{ADC_y}$), wherein there is a predetermined phase angle relationship between the first motor coil current ($I_{ADC_x}$) and the second motor coil current ($I_{ADC_y}$);
determining a coil current phase angle ($\angle I$) between the coil current vector and a pre-defined reference angle;
generating a micro-step sequencer waveform for operating the stepper motor in a micro-step mode of operation, wherein the micro-step sequencer waveform is discrete and comprises at least: a first micro-step value associated with a first phase angle position (t) of a micro-step sequencer waveform; and a second micro-step value associated with a second phase angle position ($t_2$) of the micro-step sequencer waveform;
adjusting the second phase angle position relative to the first phase angle position based on the coil current phase ($\angle I$); and,
generating the second voltage-based control signal ($\vec{U}_2$) based on the second phase angle position ($t_2$).

Clause 35—The method of clause 34, wherein the adjustment of the second phase angle position relative to the first phase angle position is determined with a damping PI-regulator, wherein the PI-regulator receives the coil current phase angle ($\angle I$).

Clause 36—A method of operating a stepper motor in a voltage-based operating mode with a control loop, the stepper motor comprising at least a first motor coil and a second motor coil, the method comprising:
measuring a first motor coil current from the first stepper motor coil;
measuring a second motor coil current from the second stepper motor coil;
determining a coil current vector based on: the first motor coil current; and the second motor coil current, wherein there is a predetermined phase angle relationship between the first motor coil current and the second motor coil current;
determining a coil current phase angle between the coil current vector and a pre-defined reference angle;
receiving a first voltage-based control signal for operating the stepper motor;
calculating a load angle of the stepper motor based on:
the coil current phase angle;
an absolute value of the coil current vector; and
the first voltage-based control signal;
calculating a second voltage-based control signal based on the load angle; and operating the stepper motor using the second voltage-based control signal.

Clause 37—The method of clause 36, further comprising:
generating a target current based on the load angle of the stepper motor.

Clause 38—The method of clause 37, wherein the second voltage-based control signal is further calculated based on the absolute value of the coil current vector.

Clause 39—The method of any of clause 37 or 38, further comprising:
determining a target load angle proportional to the absolute value of the coil current vector, wherein generating the target current is further based on the target load angle.

Clause 40—The method of clause 39, wherein the target load angle is between a lower load angle threshold and an upper load angle threshold, wherein the upper load angle threshold is less than 90 degrees.

Clause 41—The method of any of clauses 39 or 40, further comprising:
operating the stepper motor in a reverse motoring mode such that the stepper motor is configured to feedback energy into a driver supply,
determining the target load angle proportional to the absolute value of the coil current vector, wherein the target load angle is between a reverse-motoring upper load angle threshold and a reverse-motoring lower load angle threshold.

Clause 42—The method of clause 41, wherein the reverse-motoring upper load angle threshold is set to reduce energy fed back into the driver supply or to maximise energy fed back into the driver supply.

Clause 43—The method of any of clauses 39 to 42, wherein the target current is calculated by a target current PI-regulator receiving at its input the difference between the load angle of the stepper motor and the target load angle.

Clause 44—The method of any of clauses 36 to 43, further comprising
determining an emf vector based on an estimated first motor coil back-emf voltage and an estimated second motor coil back-emf voltage;
determining a back-emf voltage phase angle between the emf vector and the pre-defined reference angle; and
calculating a load reserve from the difference between the back-emf voltage phase angle and the coil current phase angle, wherein the load reserve is the load angle minus 90°.

Clause 45—The method of clause 44, wherein the back-emf voltage angle is further determined based on at least one of the following: the supply voltage; inductance of the stepper motor coils; resistance of the stepper motor coils; the first voltage-based control signal; and the first and second motor coil currents.

Clause 46—The method of any of clauses 36 to 45, wherein at a first time the stepper motor is operated using the first voltage-based control signal, the first time proceeding a second time at which the stepper motor is operated with the second voltage-based control signal.

Clause 47—The method of any of clauses 36 to 46, wherein the first voltage-based control signal is further calculated based on a first micro-step value associated with a first phase angle position of a micro-step sequencer waveform for operating the stepper motor in a micro-step mode of operation.

Clause 48—The method of clause 47, wherein the second voltage-based control signal is further calculated based on a second micro-step value associated with a second phase angle position of the micro-step sequencer waveform for operating the stepper motor in a micro-step mode of operation.

Clause 49—The method of clause 48, further comprising:
adjusting the second phase angle position of the micro-step sequencer waveform relative to the first phase angle position of the micro-step sequencer waveform based on the coil current phase angle.

Clause 50—The method of clause 49, wherein the adjustment of the second phase angle position of the micro-step sequencer waveform relative to the first phase angle position of the micro-step sequencer waveform is determined with a damping PI-regulator, wherein the PI-regulator receives the coil current phase angle.

Clause 51—The method of any of clauses 48 to 50, wherein the second voltage-based control signal is further calculated based on a voltage control signal, wherein the method further comprises:
calculating the voltage control signal by regulating the absolute value of the coil current vector based on the target current.

General

Each block of FIG. 1 and FIG. 3 is shown and defined for explanatory purposes only, it would be well understood that the algorithm or function which each block represents may be implemented in a plurality of other ways so long as the functionality as described is present. For example, the blocks of FIGS. 1 and/or 3 may be combined and implemented as part of a circuit arrangement, on a single integrated circuit, processor, or computer, or implemented by a plurality of circuit arrangements, integrated circuits, processors, and/or computers.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to."

The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

It is to be understood that one or more features from one or more of the above-described embodiments may be combined with one or more features of one or more other ones of the above-described embodiments, so as to form further embodiments which are within the scope of the appended claims.

The invention claimed is:

1. A method of operating a stepper motor in a voltage-based operating mode with a control loop, the stepper motor comprising at least a first motor coil and a second motor coil, the method comprising:
measuring a first motor coil current from the first stepper motor coil;
measuring a second motor coil current from the second stepper motor coil;
determining a coil current vector based on: the first motor coil current; and the second motor coil current, wherein there is a predetermined phase angle relationship between the first motor coil current and the second motor coil current;
determining a coil current phase angle between the coil current vector and a pre-defined reference angle;
receiving a first voltage-based control signal for operating the stepper motor;
calculating a load angle of the stepper motor based on:
the coil current phase angle;
an absolute value of the coil current vector; and
the first voltage-based control signal;
calculating a second voltage-based control signal based on the load angle; and
operating the stepper motor using the second voltage-based control signal.

2. The method of claim 1, further comprising:
generating a target current based on the load angle of the stepper motor.

3. The method of claim 2, wherein the second voltage-based control signal is further calculated based on the absolute value of the coil current vector.

4. The method of claim 2, further comprising:
determining a target load angle proportional to the absolute value of the coil current vector, wherein generating the target current is further based on the target load angle.

5. The method of claim 4, wherein the target load angle is between a lower load angle threshold and an upper load angle threshold, wherein the upper load angle threshold is less than 90 degrees.

6. The method of claim 4, further comprising:
operating the stepper motor in a reverse motoring mode such that the stepper motor is configured to feedback energy into a driver supply,
determining the target load angle proportional to the absolute value of the coil current vector, wherein the target load angle is between a reverse-motoring upper load angle threshold and a reverse-motoring lower load angle threshold.

7. The method of claim 6, wherein the reverse-motoring upper load angle threshold is set to reduce energy fed back into the driver supply or to maximise energy fed back into the driver supply.

8. The method of claim 4, wherein the target current is calculated by a target current PI-regulator receiving at its input the difference between the load angle of the stepper motor and the target load angle.

9. The method of claim 1, further comprising
determining an emf vector based on an estimated first motor coil back-emf voltage and an estimated second motor coil back-emf voltage;
determining a back-emf voltage phase angle between the emf vector and the pre-defined reference angle; and calculating a load reserve from the difference between the back-emf voltage phase angle and the coil current phase angle, wherein the load reserve is the load angle minus 90°.

10. The method of claim 9, wherein the back-emf voltage angle is further determined based on at least one of the following: the supply voltage; inductance of the stepper motor coils; resistance of the stepper motor coils; the first voltage-based control signal; and the first and second motor coil currents.

11. The method of claim 1, wherein at a first time the stepper motor is operated using the first voltage-based control signal, the first time proceeding a second time at which the stepper motor is operated with the second voltage-based control signal.

12. The method of claim 1, wherein the first voltage-based control signal is further calculated based on a first micro-step value associated with a first phase angle position of a micro-step sequencer waveform for operating the stepper motor in a micro-step mode of operation.

13. The method of claim 12, wherein the second voltage-based control signal is further calculated based on a second micro-step value associated with a second phase angle position of the micro-step sequencer waveform for operating the stepper motor in a micro-step mode of operation.

14. The method of claim 13, further comprising:
adjusting the second phase angle position of the micro-step sequencer waveform relative to the first phase angle position of the micro-step sequencer waveform based on the coil current phase angle.

15. The method of claim 14, wherein the adjustment of the second phase angle position of the micro-step sequencer waveform relative to the first phase angle position of the micro-step sequencer waveform is determined with a damping PI-regulator, wherein the PI-regulator receives the coil current phase angle.

16. The method of claim 13, wherein the second voltage-based control signal is further calculated based on a voltage control signal, wherein the method further comprises:
calculating the voltage control signal by regulating the absolute value of the coil current vector based on the target current.

17. A circuit arrangement for operating a stepper motor in a voltage-based operating mode with a control loop, the stepper motor comprising at least a first motor coil and a second motor coil, the circuit comprising:
a control unit for a voltage-based operating mode, configured to generate:
a first voltage-based control signal for operating the stepper motor at a first time;
a second voltage-based control signal for operating the stepper motor at a second time, wherein the first time proceeds the second time at which the stepper motor is operated;
an analog-to-digital converter configured to:
measure a first motor coil current from the first stepper motor coil;
measure a second motor coil current from the second stepper motor coil, wherein a coil current vector is based on: the first motor coil current; and the second motor coil current, wherein there is a predetermined phase angle relationship between the first motor coil current and the second motor coil current, wherein a coil current phase angle is an angle between the coil current vector and a pre-defined reference angle;
a load angle calculation unit configured to calculate the load angle of the stepper motor based on:
the coil current phase angle;
an absolute value of the coil current vector; and
the first voltage-based control signal;
wherein the second voltage-based control signal is based on the load angle of the stepper motor.

18. The circuit arrangement of claim 17, further comprising: a target current regulator unit coupled to the load angle calculation unit configured to generate a target current based on the load angle of the stepper motor.

19. The circuit arrangement of any of claim 18, further comprising:
a load angle controller coupled to the target current regulator unit and configured to:
receive the absolute value of the coil current vector; and,
determine a target load angle proportional to the absolute value of the coil current vector, wherein generating a target current is further based on the target load angle.

20. A method for damping stepper motor resonances of a stepper motor, the stepper motor comprising at least a first motor coil and a second motor coil, the method comprising:
measuring a first motor coil current from the first stepper motor coil;
measuring a second motor coil current from the second stepper motor coil;
determining a coil current vector based on: the first motor coil current; and the second motor coil current, wherein there is a predetermined phase angle relationship between the first motor coil current and the second motor coil current;
determining a coil current phase angle between the coil current vector and a pre-defined reference angle;
generating a micro-step sequencer waveform for operating the stepper motor in a micro-step mode of operation, wherein the micro-step sequencer waveform is discrete and comprises at least: a first micro-step value associated with a first phase angle position of a micro-step sequencer waveform; and a second micro-step value associated with a second phase angle position of the micro-step sequencer waveform;
adjusting the second phase angle position relative to the first phase angle position based on the coil current phase; and,
generating the second voltage-based control signal based on the second phase angle position.

* * * * *